April 11, 1939.                A. PARKS                    2,154,110
                            DISPLAY DEVICE
                        Filed April 2, 1938           4 Sheets-Sheet 1
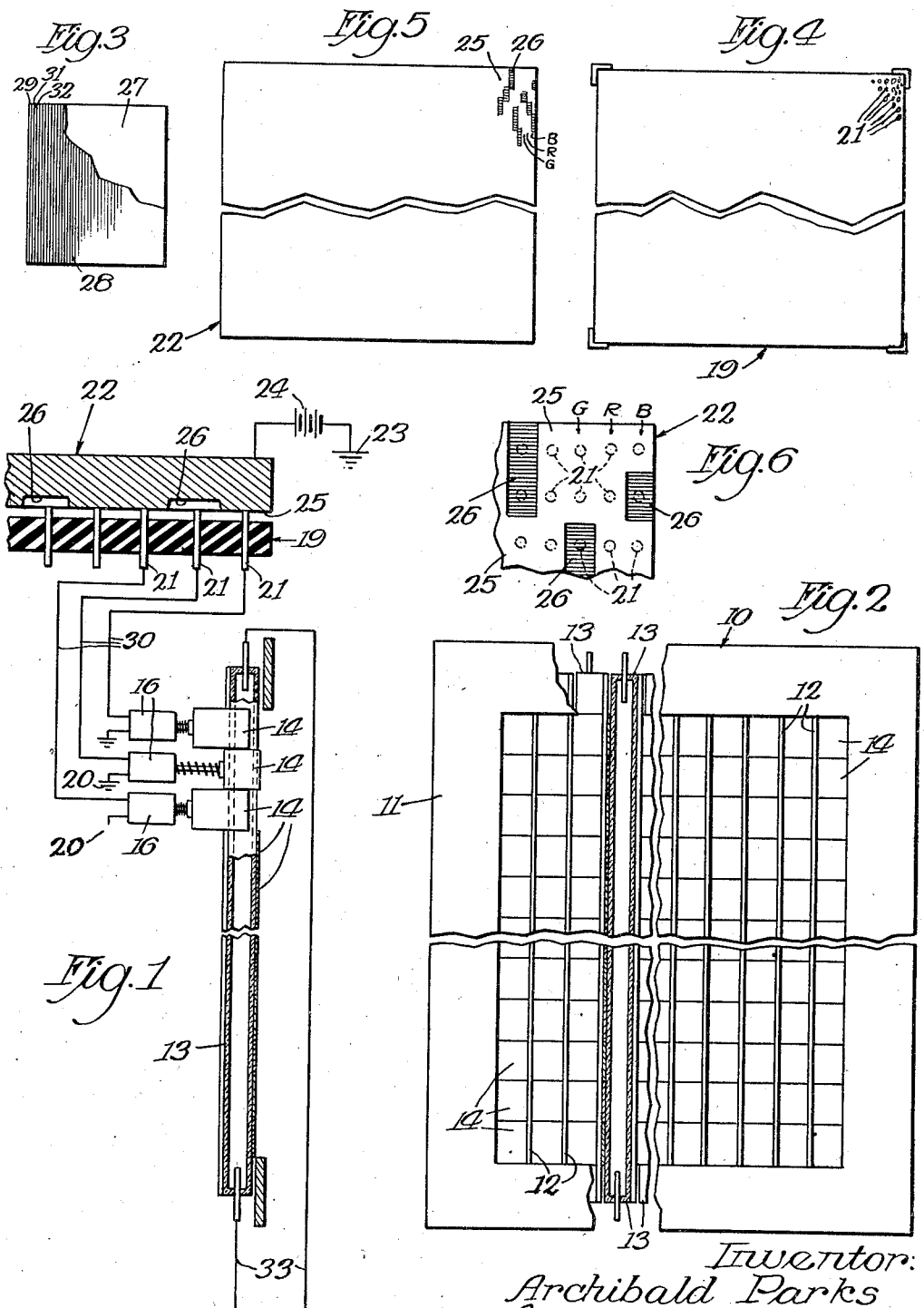
Inventor:
Archibald Parks
By Gillson, Mann & Co.
Attys.

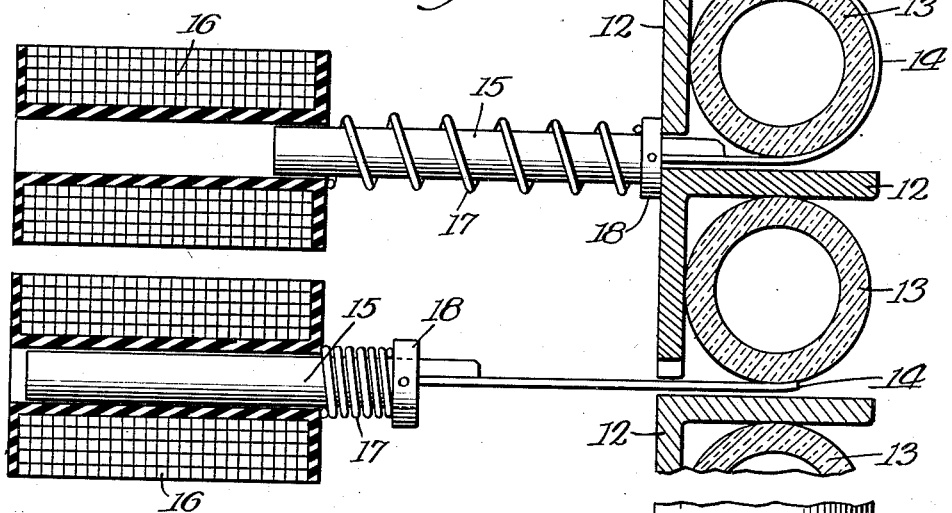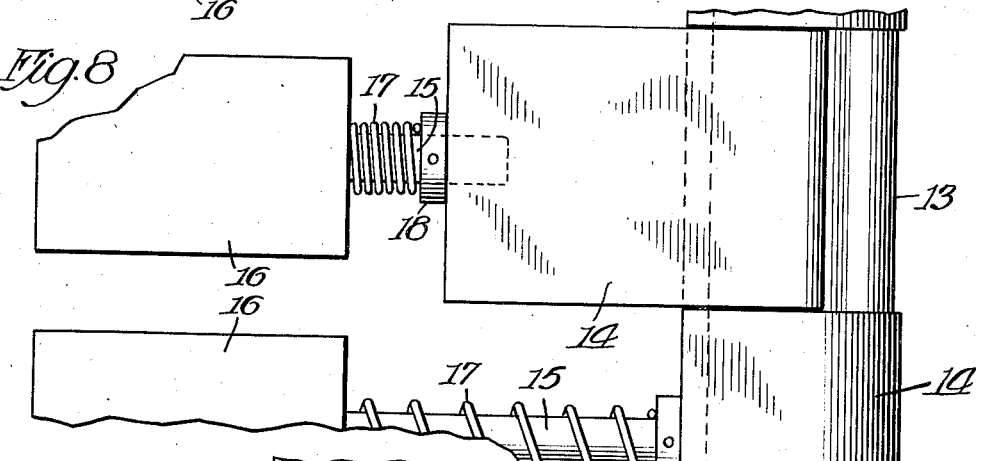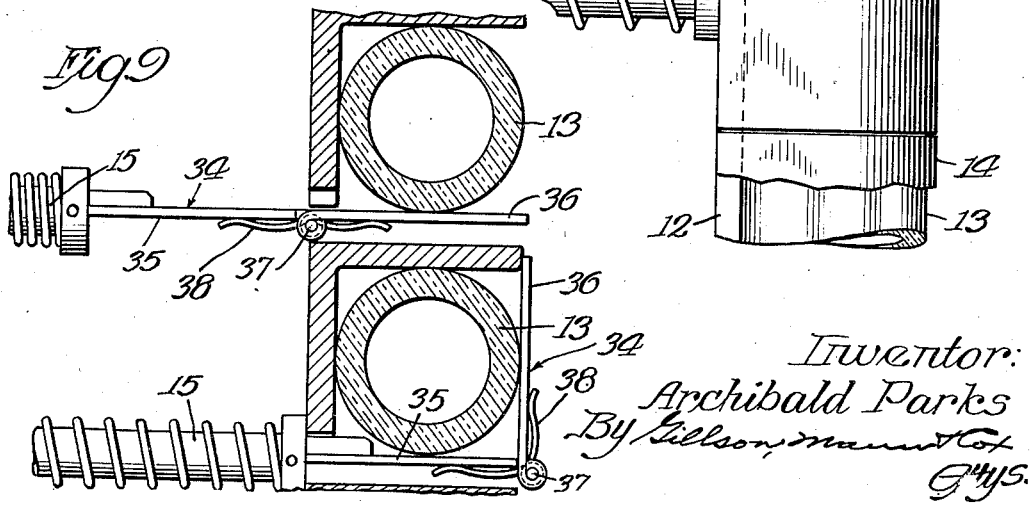

April 11, 1939.    A. PARKS    2,154,110
DISPLAY DEVICE
Filed April 2, 1938    4 Sheets-Sheet 3
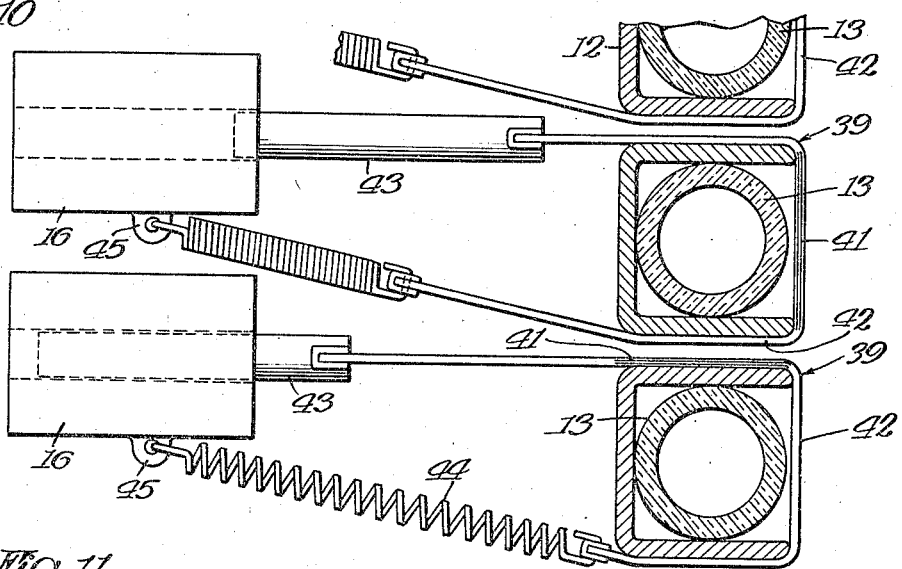
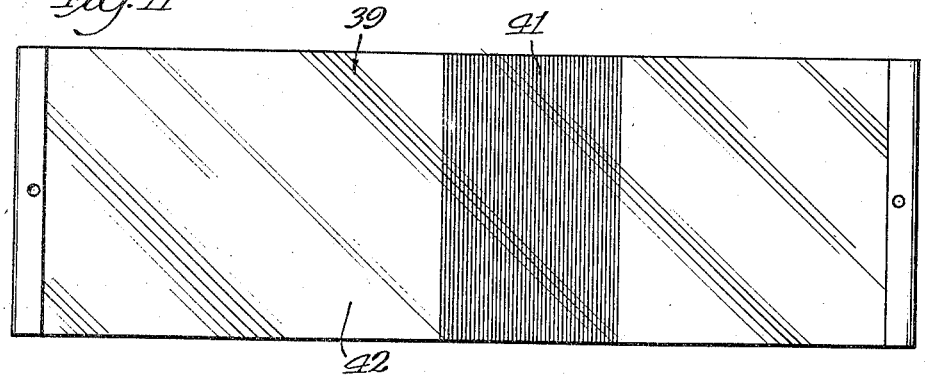
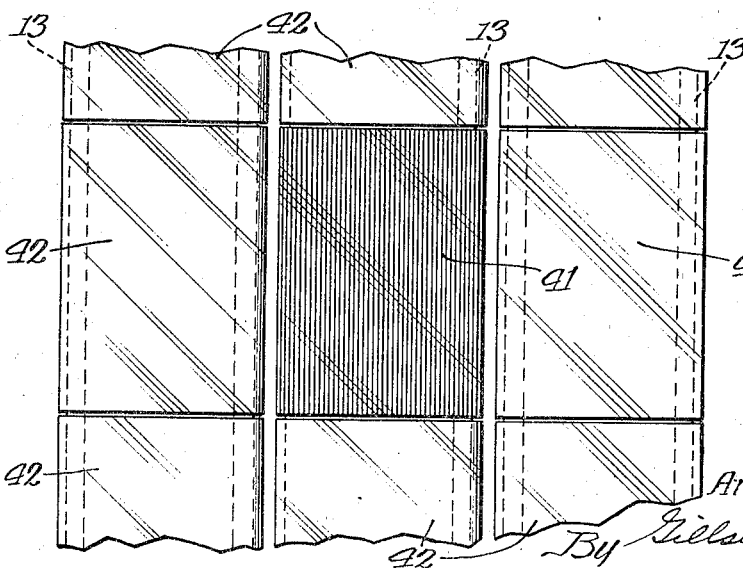
Inventor
Archibald Parks April 11, 1939.　　　　　A. PARKS　　　　　2,154,110
DISPLAY DEVICE
Filed April 2, 1938　　　　4 Sheets-Sheet 4

Inventor:
Archibald Parks
By Gillson, Mann & Co.
Attys.

Patented Apr. 11, 1939

2,154,110

UNITED STATES PATENT OFFICE 2,154,110

DISPLAY DEVICE

Archibald Parks, Chicago, Ill.

Application April 2, 1938, Serial No. 199,561

11 Claims. (Cl. 40—52)

This invention relates to display devices and more particularly to display devices of the illuminated type for use as billboard advertising, window display, and the like.

One of the objects of the invention is the provision of a new and improved display device having novel means for depicting the display design in its actual or natural colors.

Another object of the invention is the provision of a new and improved display board having novel means for changing the display design at a comparatively small cost.

A further object of the invention is the provision of a new and improved display board together with a novel control panel whereby the design on the display board may be changed by simply changing the control panel.

Another object of the invention is the provision of a display board that will present a display design or image in colored lights by night and a painted image or design during the daytime.

Another object of the invention is the provision of a new and improved display device in which the design may be produced at a minimum of time and expense, and on which the image or design may be changed with a fraction of the expense necessary in the present type of display devices.

Other and further objects and advantages of the invention will appear from the following description, taken in connection with the accompanying drawings, in which—

Fig. 1 is a side elevation of the device shown more or less diagrammatically, with parts in section and parts broken away;

Fig. 2 is a front elevation of the construction, with parts in section, to show one of the light tubes, with parts broken away;

Fig. 3 is a front elevation of a color screen and a negative used in preparing a control board for use on the display board;

Fig. 4 is a front elevation of a switchboard;

Fig. 5 is a front elevation of the control board, with parts broken away;

Fig. 6 is a view of a section of the control board shown in Fig. 5 but on an enlarged scale;

Fig. 7 is a horizontal section through the control board shown more or less diagrammatically and showing the mechanism for operating the masks and also showing one mask in operative position and the other in inoperative position;

Fig. 8 is a side elevation of one of the lighting tubes shown more or less diagrammatically and showing the mask withdrawn for displaying the lighted tube and also showing another mask in operative position;

Fig. 9 is a horizontal section of two of the light tubes and associated mechanism shown more or less diagrammatically and showing a modified form of mask, one of the masks being shown in operative position and one in inoperative position;

Fig. 10 is a view similar to Fig. 9 but showing a further modified form of construction and showing one mask in operative position and another in inoperative position;

Fig. 11 is a plan view of one of the masks shown in Fig. 10;

Fig. 12 is a front elevation of the display board showing one of the masks in operative position for masking the light and the remainder in inoperative position.

Figure 13:
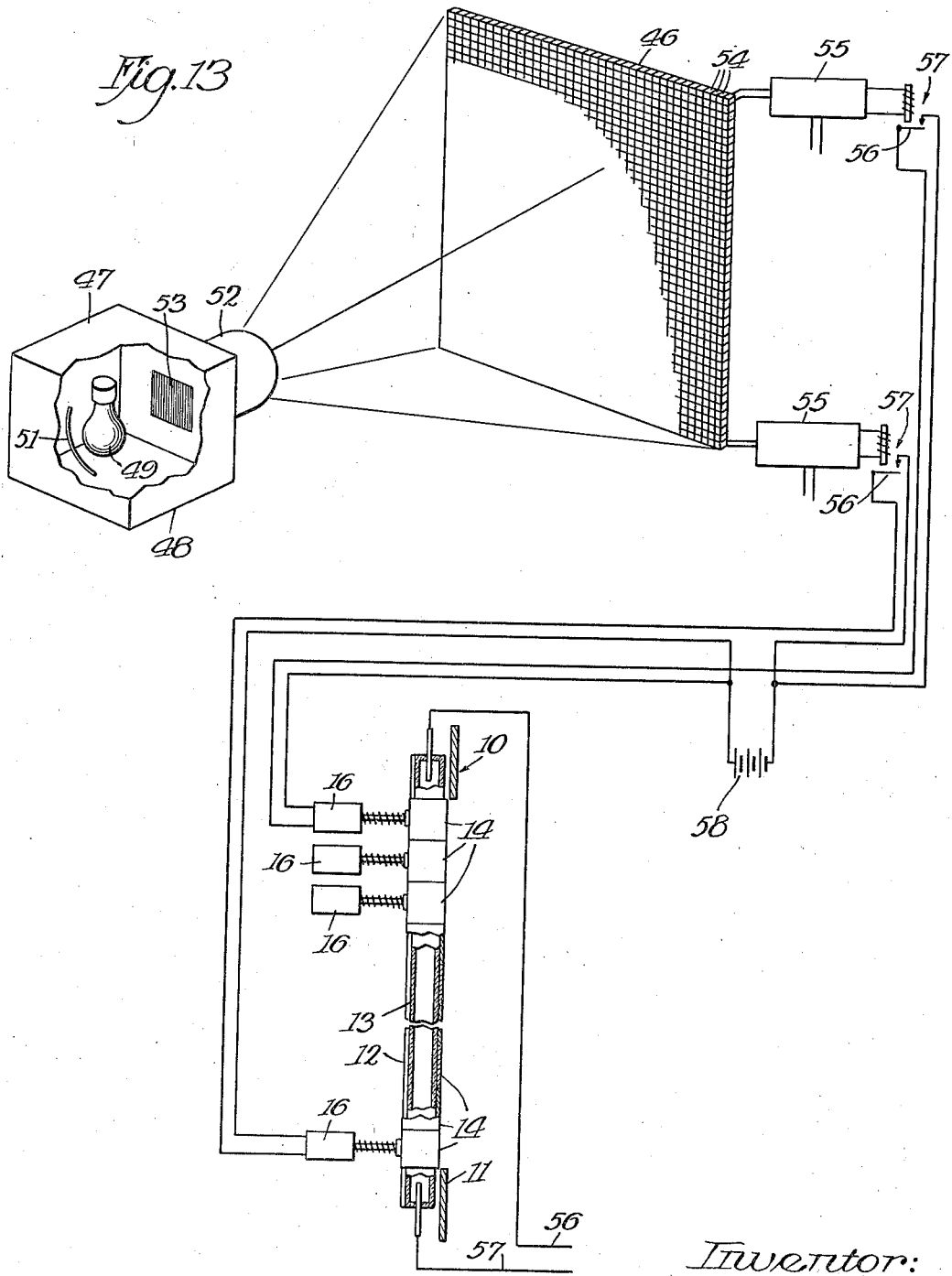
Fig. 13 is a diagrammatic view of a modified form of construction.

It is common practice in the erection of display devices or signs in which electric lights are employed to outline the design or figure used in the design in electric tubes or bulbs of the same or different colors and when the design or image depicted is to be changed, the entire wiring must be changed. This is objectionable because of the enormous expenditure of time and effort to make the changes, often amounting to as much or even more than the erection of the original construction because of the necessity of removing or tearing out at least a portion, if not all, of the original wiring preparatory to rewiring for the new design.

The present invention seeks to avoid these difficulties by the provision of a new and improved display board which need not be changed in any way for changing the design. All that is necessary for a new design is to prepare a new design and make a corresponding control board for controlling the lighting system.

In the display of designs, it is highly desirable, especially if natural or lifelike objects be depicted in the display, that the coloring of the objects and scenes be as natural or lifelike as possible. In the present display device, especially on the device displayed at night, the images and scenes are produced by the proper control of the exposure of light units representing the three primary colors, blue, red and green, in such a manner as to cause the rays projected therefrom to blend to form the design or image intended to be displayed.

Referring now to Figs. 1 to 8, inclusive, the reference character 10 designates the display device which comprises a frame 11, retaining members in the form of vertically extending angle bars 12, see Fig. 7, mounted on the frame and in which are secured the light tubes 13, Figs. 2 and 7.

The tubes 13 are adapted to be arranged in groups of three tubes each, which are adapted to contain illuminating gas and each group of three tubes has a gas or the material of the tube so colored, or both, that the light emanating from the tubes will be the three primary colors, green, red and blue, respectively. Each tube extends across the frame 11 in one direction; as shown, they extend vertically, and the groups are arranged contiguous to each other and are continuous across the frame from side to side thereof. The groups of light tubes are so arranged that the colors, which are the same in all groups, appear in the same order in all the groups.

Suitable means are provided for masking a portion or all of the light emanating from each tube. In the form of the construction selected to illustrate one embodiment of the invention, a plurality of masks are employed for each tube, each mask concealing a square section of the tube or the area may be slightly greater in vertical dimension than the overall width of the tube so that the light emanating from the tube will be a beam substantially square or slightly rectangular in cross-section. The masks may each be considered as concealing a unit surface of the tube.

Suitable means are provided for operating these masks separately and individually or in groups or combinations as occasion may require. In the form of the construction shown in Figs. 7 and 8, a thin resilient plate 14 constitutes a mask for an individual unit space of the light tube. The mask 14 is normally curved on the radius of the exterior of the light tube as shown at the top of Fig. 7 and closely engages the outer surface of the tube 13 when in operative position. The inner end of the mask 14 is attached to a plunger 15 of a solenoid 16, grounded as at 20 in Fig. 1, so that when the solenoid 16 is energized from a suitable source of supply as will presently appear, the plunger 15 will be withdrawn in the solenoid and this will move the mask to the position shown in the lower part of Fig. 7 thus making a unit exposure of the tube, that is, exposing the light tube 13 at that point. A spring 17, encircling the plunger 15 and engaging against a collar 18 at one end and having its opposite end engaging the end of the solenoid 16, returns the plunger to the inoperative position shown in the upper part of Fig. 7 when the solenoid 16 is deenergized. When moved to this position, the resiliency of the mask 14 will cause the same to closely engage the light tube 13 shown in said figure.

In order that the lighted tubes, when unmasked, shall disclose the desired design, suitable means are provided for selecting the proper units to be unmasked. This is accomplished by contact members in the switchboard as will now be described. The switchboard 19, shown in Figs. 1 and 4, is of any desirable form and of any suitable insulating material such as rubber, Bakelite, or the like. As shown, the board is rectangular and is provided with contact members 21 which are arranged in rows, each row having a corresponding tube 13, the masks of which are controlled by these contact members 21.

The contact members 21 are each placed in series with an electric source 24 and the control board 22 and with its corresponding solenoid 16 so that when the circuit is closed through the contact member and its corresponding solenoid, the plunger 15 will remove the corresponding mask and make the unit exposure.

A suitable control board 22 is provided for closing the different circuits through the contact members 21. This control board is of any suitable conducting material. Any source of current may be used, such as the battery 24 which may be as at 23. The control board 22 is of metal, such as copper or like conductor, and has etched on it the corresponding design of the negative, made from an exposure of the object to be reproduced, so that the figure or design etched on the plate 22 will have elevated portions 25 and depressed portions 26, corresponding to the transparent and opaque portions of the negative, as shown in Figs. 1 and 6 of the drawings.

The negative is made by exposing a sensitized plate or film 27 (Fig. 3) through a color filter 28. The color filter 28 is provided on its face with a plurality of colored strips or colored lines 29, 31 and 32, arranged in groups of a predetermined order. These lines may be varied in number from 200 to 900, and the colors employed are complementary. If two colors alone are used they may be red and greenish blue, and are arranged alternately entirely across the filter. In the form of the construction, however, each group comprises three colors, green, red and blue, 29, 31 and 32, respectively (Fig. 3). The groups are contiguous across the filter, and each line extends entirely across the filter.

The colored lines of the filter correspond to the colored tubes, and the parts are proportional in dimensions and similar in arrangement. In fact the switch and control boards are of the same size, and are much smaller than the display board and larger than the original negative, but the parts are in proportion to those of both the original negative and the display board, so that in use the proper units 58 will be energized.

The control board 22 is adapted to be accurately held in position on the switchboard 19 by any suitable means, and is of substantially the same size so that when the control board 22 is in position the elevated portions 25 will close the circuit through the contact members 21 at points opposite the elevated portion of the board. The contact members 21 opposite the depressions 25 will, obviously, not close the circuit through the control board, and consequently the corresponding masks will remain in position in front of the section or unit of the tube which they control. Each tube is energized in the usual way by a circuit through the conductor 33 from any suitable source or supply, as from the secondary of a transformer.

In the operation of the device, after the control board 22 has been etched the same is applied to the switchboard and the contacts 21 that are engaged by the projections 25 on the control board will close the circuit through these contacts, and in turn will energize the corresponding solenoids 16 for operating the masks for moving them to retracted or inoperative position, so that that portion of the tube which would not be concealed by the mask 14 will permit light to radiate from the tube through this opening. The circuit through one of the solenoids may be traced from the battery 24 through the metallic control board 22, projection 25, contact member 21, conductor 30, to the ground at 20, 23, and back to the battery 24 or other source of electric supply. The unmasked portions or units of the tube will then outline the figure or design by the blending of the light rays projected through these unmasked portions.

When it is desired to change the design it is only necessary to expose a new film 27 and prepare another control board in a manner already described, and substitute the new board for the one disclosed in Fig. 1 of the drawings. In other words, the design may be changed by simply changing the control board 22.

In Fig. 9 is shown a modified form of masks for shielding the tubes 13. This form of construction differs from the form already described merely in the form of the masks 34. In this form of construction each of the masks 34 comprises two sections 35 and 36, pivoted together as at 37. A coil spring 38 is mounted on the pintle 37 of the hinge, and its ends engage the sections 35 and 36, tending to move the section 36 at right angles to the section 35 when the parts are in the position shown in the lower portion of Fig. 9. When the plunger 15 is withdrawn by the corresponding solenoid, the mask 34 is pulled rearwardly to the left in Fig. 9, and this will cause the section 36 to straighten out against the tension of the spring 38 until the sections 35 and 36 are in alignment, as shown in the upper portion of Fig. 9. The section 36 is opaque so that when it is in the position shown at the bottom of Fig. 9, it will prevent light from the tube 13 passing through the same. The section 36 of this front face is painted any suitable color which may be uniform over the entire board and function as a background for the design or, if desired, a suitable design may be painted on the face of these masks so that during the daytime, such design may be seen and at this time the tubes 13 need not be energized.

In Figs. 10, 11 and 12 is shown a still different form of mask and in this form of construction, the mask 39 is in the form of a flexible strip having an opaque section 41 which, when the device is in inoperative position, as shown in the upper portion of Fig. 10, completely masks the light from the tubes 13. The section 42 of the mask 39, which is drawn across in front of the tube 13 when the solenoid 16 is energized, is transparent so that light from the tube 13 may pass through the same for forming the design as in the previous construction.

In this form of construction, one end of the mask 39 is secured to the plunger 43 of the solenoid and its other end is connected to a spring 44. The other end of the spring is secured to an apertured lug 45 fixed to the solenoid 16 or some adjacent part so that when the solenoid 16 is energized, it will move the mask against the tension of the spring 44 from the position shown in the upper portion of Fig. 10, where the opaque section is in front of the tube, to the position shown at the lower part of said figure wherein the transparent section 42 is in front of the tube. When the solenoid is de-energized, the spring 44 will return the opaque section to a position in front of the tube.

The form of construction shown in Fig. 13 differs from the forms of constructions already described in that different means are provided for controlling the operation of the masks 14. Since the display device or board 10, the arrangement of the tubes 13, masks 14 and mask operating devices 16, shown in Fig. 13, are substantially the same as that already described, and function in substantially the same manner, it is not thought necessary to illustrate or describe the same further than to state that the masks 14 may be of any of the types or forms described above.

The control board 46 differs materially from that already described in that it is composed of a plurality of light sensitive or photo-electric cells 54, one for each mask.

Suitable means are provided for energizing the various cells. This is accomplished by projecting an image on the control board 46 by a light projector 47. The light projector comprises a container 48 in which is mounted a source of light as the electric bulb 49 having the reflector 51 for projecting the light through a light projector tube 52 having a lens therein as is common in light projectors.

The control board 46 is of the same form as the main display board 10 and the image projected thereon is co-extensive with the board as indicated in Fig. 13.

A photograph of the scene or image to be depicted on the display board is photographed through a color screen such as that shown at 28 in Fig. 3 and a positive film 53 is made from the negative of this exposure. The positive film 53 is then placed in the light projecting device and the light passing through the same will energize the light sensitive cells 54 for operating the masks corresponding to the cells that are energized. The positive film and colored tubes of the display board have the same corresponding arrangement so that the portions of the film affected by red rays of light, for instance, will energize corresponding cells for operating corresponding masks for the red lights on the display board. In other words, the cells 54 are arranged in vertical rows corresponding to the shutters and colored tubes of the display board. The wiring is such that the first line of cells controls the first line of masks or shutters and so on for each row of cells and masks.

The cells 54 will be exposed to the light projected by the projector 47 and where the rays of light passing through different parts of the plate 53 are intense enough, the cells will be energized and the current passing from the cells will be amplified by suitable means 55 which may be of the usual or any well known construction. The amplified current from the cell is adapted to energize a relay 56 for closing a switch 57 for operating the corresponding mask control 16 which in turn will move the masks 14 from in front of the light tubes. The current for operating the mask control member 16 may be derived from any suitable source of power and as shown herein, is derived from a battery 58. It is understood that there is a cell 54 for controlling the operation of each mask 14 in the manner described above. The current for energizing the light tubes is supplied through the leads 56 and 57.

It is thought from the foregoing, taken in connection with the accompanying drawings, that the construction and operation of my device will be apparent to those skilled in the art and that changes in size, shape and proportion may be made without departing from the spirit and scope of the appended claims.

I claim as my invention:

1. A display device comprising a display board composed of contiguous groups of electric light tubes, each group composed of three tubes of the three primary colors, green, red and blue, said tubes extending across the device in one direction and said groups being arranged contiguous to each other across the screen in the other direction, means for energizing said tubes, a plurality of masks for each tube, and means for operating said masks for exposing the light in said tubes for depicting predetermined designs on said board.

2. A display board comprising a plurality of transparent light tubes arranged contiguous to each other in a common plane, said tubes being arranged in groups, each group comprising three tubes capable of emitting light of three primary colors, a plurality of masks for each tube and movable across the face thereof, means for energizing said tubes, and means for independently removing said masks from in front of said tubes.

3. In a display device, a display board having a plurality of narrow tubes continuous across the face of the board, said tubes being arranged in groups and when energized representing three primary colors uniformly arranged, and means for moving an opaque mask before one of said tubes.

4. In a display device, a display board comprising a plurality of tubes arranged in groups contiguous and continuous across the board, each group comprising three tubes representing three primary colors, a plurality of opaque masks for each tube, said masks being arranged in rows transversely of said board, and electrically operated mechanism for operating said masks individually or in predetermined groups.

5. A display board comprising a plurality of light projecting elements arranged in groups of three continuous across the board, each group being capable when energized of projecting rays of light of three primary colors, a plurality of masks of opaque material extending across the faces of said elements, each mask being substantially square, electric means for moving said mask to inoperative position, and resilient means for returning them to operating position when released.

6. A display device comprising a plurality of tubular members relatively small in cross-section and arranged in a common plane, each tubular member having its forward portion transparent, means for electrically energizing said tubes, means for causing said tubes to radiate rays of light of the primary colors, a plurality of means for masking each of said tubes, mechanism for operating said masks, and means for predetermining the operation of said mechanism.

7. In a display device, a plurality of groups of containers arranged contiguous to each other in a common plane, each group comprising one container for each of the primary colors arranged in the same order in all groups, means within said tubes for energizing the same for causing them to project rays of light of the primary colors, means for masking said containers, a switchboard having conductors connected to said means, mechanism for operating said second-named means, and a control board for closing the circuits through said mechanism for exposing portions of said containers for depicting on said board a predetermined design.

8. In a display device, a display board comprising a plurality of light transmitting members arranged in groups of a plurality of members continuously across the face of the display board and each group being adapted to be illuminated to emit rays of light of primary colors arranged in regular order, means for illuminating said members, a plurality of masks for each tube, means for operating said masks, a switchboard having a contact member for each mask, a control board having etched thereon the corresponding design of a negative made by an exposure through a cool filter having fine lines of the three primary colors, green, red and blue thereon, engaging said contact members for moving certain of said masks to inoperative position.

9. In a display device, a display board formed by a plurality of tubes arranged in groups continuous across the board, means for causing each tube of a group to emit a different primary color for producing white light when blended, a plurality of masks for masking each tube, means for independently operating said masks, and light sensitive means for controlling said last-named means.

10. In a display device, a display board formed by a plurality of tubes arranged in groups continuous across the board, means for causing each tube of a group to emit a different color, the colors from each group being capable of producing white light when blended, a plurality of masks for each tube, mechanism for operating each mask independently, a control board having a light sensitive cell for each mask for controlling said mechanisms, and means for projecting an image on said control board for energizing certain of said cells for operating said mechanisms.

11. In a display device, a display board having a plurality of narrow tubes continuous across the face of the board, said tubes being arranged in groups and when energized each group representing a plurality of colors uniformly arranged, said colors being capable of producing white light when blended, and means for moving an opaque mask before one of said tubes.

ARCHIBALD PARKS.